(12) United States Patent
Iotti

(10) Patent No.: US 12,344,518 B2
(45) Date of Patent: Jul. 1, 2025

(54) TELEHANDLER WITH IMPROVED CAB

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 173 days.

(21) Appl. No.: 16/801,383

(22) Filed: Feb. 26, 2020

(65) Prior Publication Data

US 2020/0277172 A1 Sep. 3, 2020

(30) Foreign Application Priority Data

Feb. 28, 2019 (IT) .................. 102019000002935

(51) Int. Cl.
*B66F 9/075* (2006.01)
*B32B 17/10* (2006.01)
(Continued)

(52) U.S. Cl.
CPC ...... *B66F 9/0759* (2013.01); *B32B 17/10036* (2013.01); *B32B 17/10752* (2013.01); *B32B 17/1077* (2013.01); *B32B 27/08* (2013.01); *B32B 27/365* (2013.01); *B32B 27/40* (2013.01); *B60J 1/001* (2013.01); *B60J 1/02* (2013.01); *B32B 2250/40* (2013.01);
(Continued)

(58) Field of Classification Search
CPC ........ B32B 17/10036; B32B 17/10752; B32B 17/1077; B32B 2250/40; B32B 2307/558; B32B 2315/08; B32B 2369/00; B32B 2375/00; B32B 2605/006; B32B 27/08; B32B 27/365; B32B 27/40; B60J 1/001; B60J 1/02; B66F 9/0655; B66F 9/07545; B66F 9/0759

See application file for complete search history.

(56) References Cited

U.S. PATENT DOCUMENTS 3,388,032 A * 6/1968 Saunders .......... B32B 17/10036
428/215
4,619,479 A * 10/1986 Martin, Jr. .......... B66F 9/07545
296/146.16

(Continued)

FOREIGN PATENT DOCUMENTS

CN 1847138 A 10/2006
CN 201895436 U 7/2011
(Continued)

OTHER PUBLICATIONS

Machine Translation of DE 102016118434 (2018).*
(Continued)

*Primary Examiner* — Callie E Shosho
*Assistant Examiner* — Krupa Shukla
(74) *Attorney, Agent, or Firm* — Chrisman Gallo Tochtrop LLC

(57) ABSTRACT

Described is a telehandler having a cab (1) equipped with a roof (10) defined by a transparent or semi-transparent protective cover (11) which comprises one or more materials designed to withstand the falling of hazardous material for the safety of an operator onboard the cab (1).
The cover includes a plurality of layers of which at least one layer made of glass and a layer made of polymeric material.

10 Claims, 3 Drawing Sheets

(51) Int. Cl.
*B32B 27/08* (2006.01)
*B32B 27/36* (2006.01)
*B32B 27/40* (2006.01)
*B60J 1/00* (2006.01)
*B60J 1/02* (2006.01)

(52) U.S. Cl.
CPC ..... *B32B 2307/558* (2013.01); *B32B 2315/08* (2013.01); *B32B 2369/00* (2013.01); *B32B 2375/00* (2013.01); *B32B 2605/006* (2013.01)

(56) References Cited

U.S. PATENT DOCUMENTS

| | | |
|---|---|---|
| 5,589,272 A | 12/1996 | Braun |
| 6,276,750 B1 | 8/2001 | Frisch |
| 7,472,945 B2 | 1/2009 | Miura |
| 9,044,919 B2 | 6/2015 | Offermann et al. |
| 9,694,563 B2 | 7/2017 | Offermann et al. |
| 9,694,653 B2 | 7/2017 | Offermann et al. |
| 2007/0241583 A1* | 10/2007 | Magni .................. B60N 2/1842 296/65.03 |
| 2012/0219749 A1* | 8/2012 | Leighton ........... C04B 35/63488 428/76 |
| 2015/0111016 A1* | 4/2015 | Fisher .................... B32B 7/022 428/215 |
| 2017/0227333 A1* | 8/2017 | Villalobos ............... B32B 27/34 |
| 2018/0364012 A1* | 12/2018 | Iotti ........................ F41H 5/226 |

FOREIGN PATENT DOCUMENTS

| | | |
|---|---|---|
| CN | 201895437 U | 7/2011 |
| CN | 202826594 U | 3/2013 |
| CN | 104540696 A | 4/2015 |
| CN | 107739017 A | 2/2018 |
| DE | 4415878 A1 | 11/1995 |
| DE | 19815126 A1 | 10/1999 |
| DE | 102005049006 A1 | 4/2007 |
| DE | 202011102713 U1 | 10/2012 |
| DE | 102016118434 A1 | 3/2018 |
| EP | 2799387 A1 | 11/2014 |
| EP | 2852501 A2 | 4/2015 |
| EP | 3153457 A1 | 4/2017 |
| FR | 2649064 A1 | 1/1991 |
| JP | 2007237890 A * | 9/2007 |
| WO | 2013175104 A2 | 11/2013 |

OTHER PUBLICATIONS

Machine translation of JP-2007237890-A, retrieved Oct. 6, 2023. (Year: 2007).*
Salah Malkawi/AFP; "The Pope Visits the Holy Land". Time, New York, NY, US Mar. 20, 2000 (Mar. 20, 2000), p. 1, XP00259622, the whole document.
Chinese Office Action in Corresponding Chinese Patent Application No. 202010125296.5 issued Jan. 20, 2023, 8 pages.

* cited by examiner

TELEHANDLER WITH IMPROVED CAB

This invention relates to a telehandler equipped with an improved cab. More in detail, the invention relates above all to a cab which is able to provide a better visibility to the operator of the telehandler whilst guaranteeing a level of protection in accordance with the highest standards required by the regulations in the sector and by the market.

Currently, the prior art cabs C of the telehandlers T are equipped with a protective grille G located above the roof which protects the operator in the event of a fall of objects on the cab C (see FIG. 1).

For example, the grille G is designed to protect the operator in cases in which the load or a part of it falls from the gripping equipment, such as a fork F or the like, when this is carried by the operating arm B above the cab C.

Still more in detail, the protective grilles have been designed to satisfy the international standard FOPS ("Falling Object Protective Structures") which specifies the tests which the protective structures must be able to pass.

The reason why a grille G is used and not a continuous plate positioned above the roof is that, in order to perform his work correctly, the operator must be able to directly observe the load during the operating steps in which it is carried above the cab C by the operating arm B.

However, this solution is not completely effective since the grille G is in any case an element which obstructs the view of the operator, even if it does not completely prevent it.

For this reason, the need has been felt for a long time in the market of self-propelled operating machines for a solution which, whilst maintaining the same standard of protection from falling objects and materials, allows an improved view to be provided to the operator of what is located above the roof of the cab.

The technical purpose which forms the basis of the invention is to provide a telehandler equipped with a cab for telehandlers which is able to satisfy the above-mentioned need.

The technical purpose is achieved by the telehandler made according to claim 1.

BRIEF DESCRIPTION OF DRAWINGS

Further characteristics and advantages of the present invention will become more apparent in the non-limiting description of a preferred but non-exclusive embodiment of the proposed telehandler, as illustrated in the accompanying drawings, in which:

With reference to FIG. 2, the numeral 1 denotes a cab for telehandlers or other types of self-propelled operating machines, made according to the invention.

The proposed cab 1 is designed for use both with a telehandler of the fixed type and of the rotary type, that is to say, equipped with a rotatable platform mounted on the carriage (or frame) equipped with wheels.

The cab 1 according to the invention does not have a protective grille but is equipped with a roof 10 which is defined by a transparent or semi-transparent protective cover 11 (that is, not totally opaque) designed to withstand the falling of material which is dangerous for the safety of an operator who is on board the cab 1.

In other words, the roof 10 is defined by a cover 11 which is not completely broken through by objects and materials which fall on the roof 10, thereby preventing serious physical injury to the operator.

More specifically, the protective cover 11 has been designed to satisfy the FOPS criteria according to UNI EN ISO 3449:2009, level II and, under the maximum stress specified by this standard, the cover 11 can deform and/or break down but does not allow the weight to pass through or bend and thus enter the space occupied by the operator.

In this way, the operator who is on board the proposed cab 1 can observe directly, that is to say, without obstructions, the load and/or the equipment carried by the operating arm when they pass above the cab 1 and at the same time is protected from the accidental falling of objects and materials, for example part of the load, to satisfy, lastly, the market requirements already described during the discussion of the prior art.

More specifically, the protective cover 11 is designed to withstand an impact of an object which has a kinetic energy substantially equal to 11600 Joules, produced, for example, by an object which weighs substantially 238 kg and falls substantially from 5 metres.

More generally speaking, the cover 11 is designed to withstand an impact greater than 11000 J and, for example, produced by an object weighing at least 230 kg falling from a height of at least 4 metres.

The protective cover 11 may be made from two or more layers made of glass and polycarbonate, alternated with each other and joined by an adhesive substance interposed between them.

Preferably, the cover 11 includes two glass layers which define an outermost surface and an innermost surface of the cover, between which there is at least one inner layer made of polymeric material.

More in detail, the cover 11 may include a plurality of inner layers, made of polycarbonate and polyurethane.

More specifically, it is preferable that there are three inner layers made of polyurethane and two made of polycarbonate, alternated with each other.

Preferably, each glass layer has a thickness of between two and four millimetres and/or each polycarbonate layer has a thickness of between twelve and eighteen millimetres and/or each polyurethane layer has a thickness of between 0.5 millimetres and one millimetre.

Figure 3:
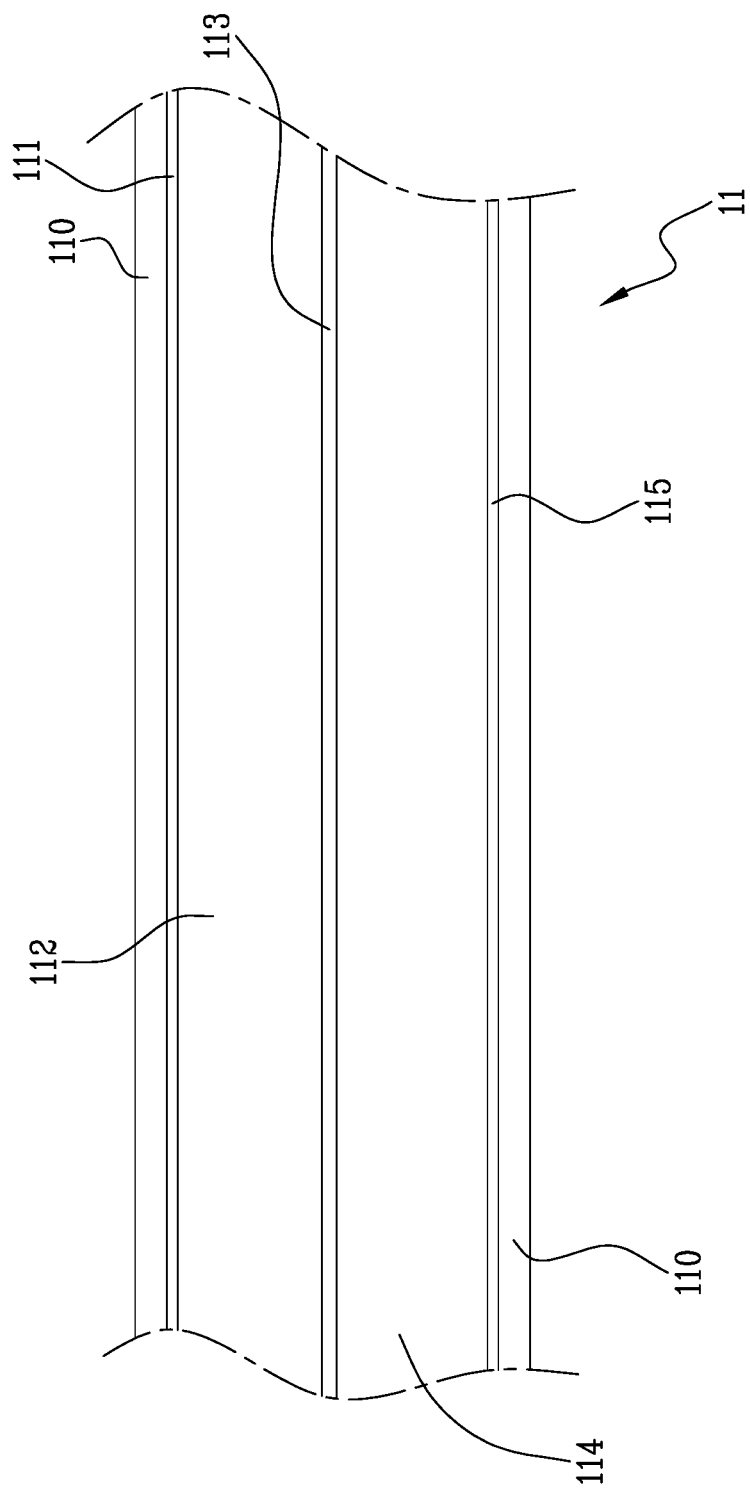
FIG. 3 is a cross-section view of a protective cover with which the cab of FIG. 2 is provided.

According to the preferred embodiment of the invention, shown schematically in FIG. 3, the cover 11 comprises the following succession of layers: a glass layer 110 of 3 mm, a polyurethane layer 111 of 0.76 mm, a polycarbonate layer 112 of 15 mm, a polyurethane layer 113 of 0.76 mm, a polycarbonate layer 114 of 15 mm, a polyurethane layer 115 of 0.76 mm and a glass layer 116 of 3 mm.

Figure 1:
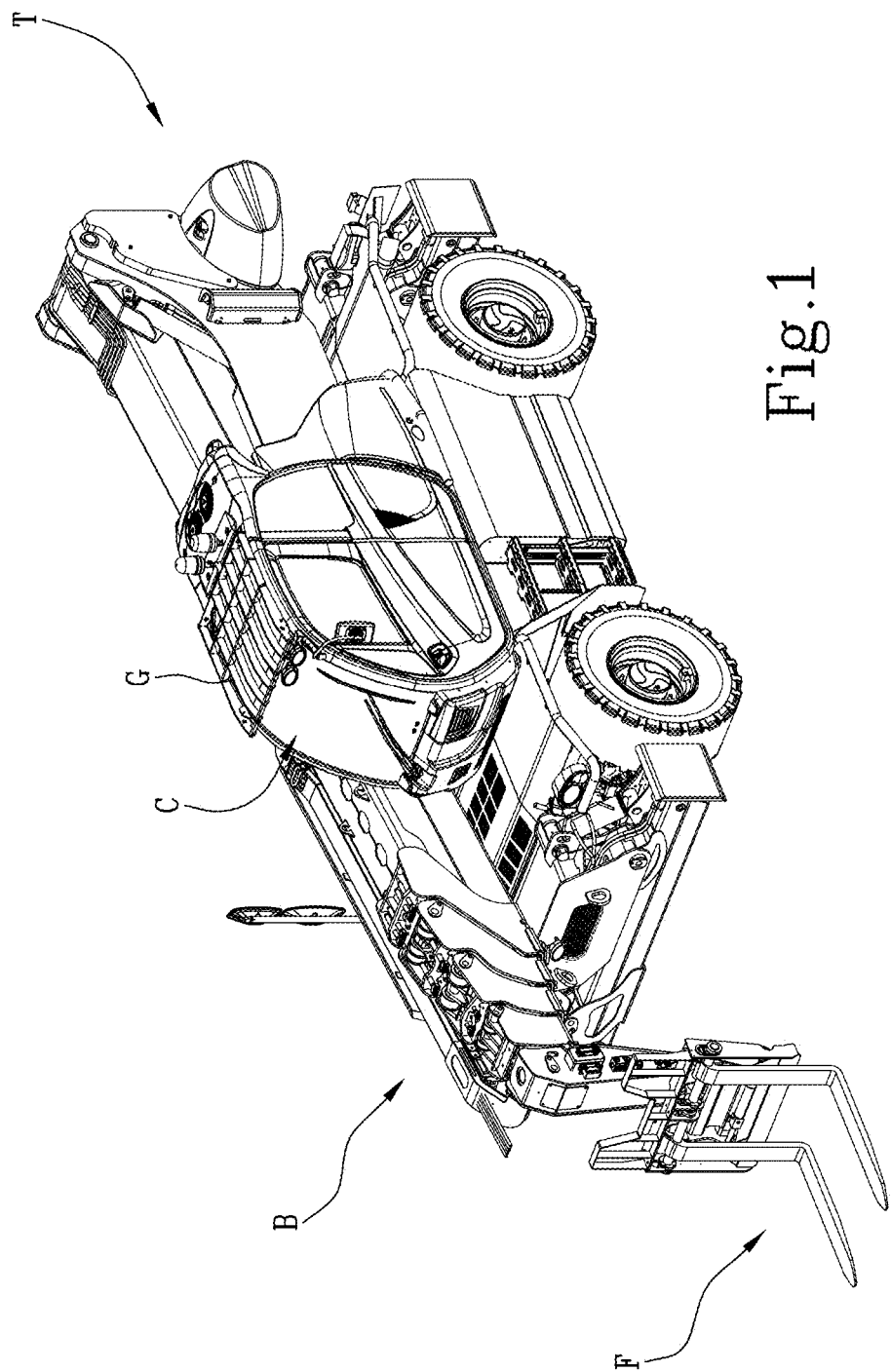
FIG. 1 is an axonometric view of a telehandler equipped with a cab according to the prior art.
Figure 2:
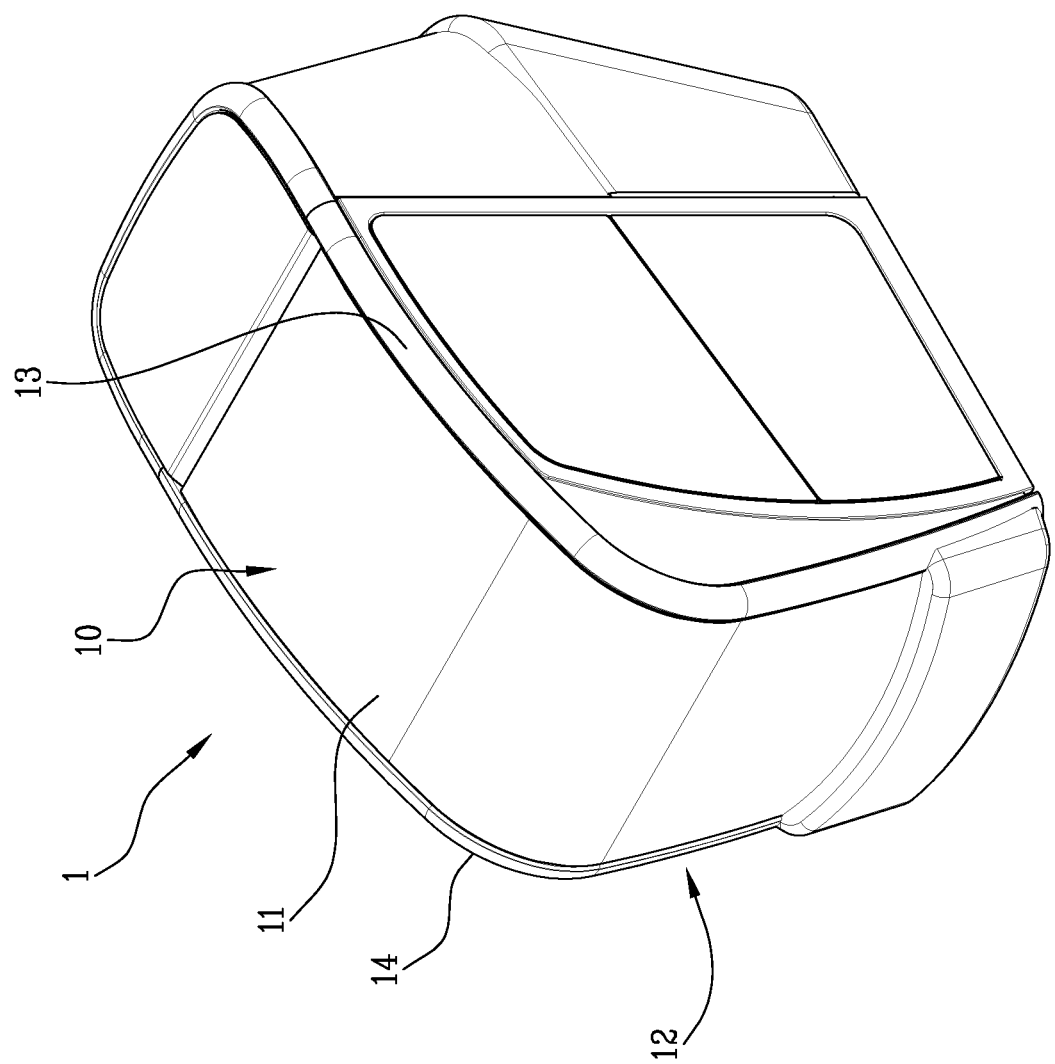
FIG. 2 is an axonometric view of the cab according to the invention.

According to the preferred embodiment shown in FIG. 2, the protective cover 11 extends forwards forming also the windscreen 12.

In other words, the windscreen 12 and the roof 10 are integrated in a single central and continuous cover 11, which is mounted, at the opposite edges, on two suitably shaped side uprights 13, 14.

It is clear, therefore, that the telehandler which comprises the cab 1 according to the invention has performance levels which cannot be obtained from prior art telehandlers, with obvious advantages in terms of operating convenience and effectiveness and with the full safety of the operator.

The invention claimed is:
1. A telehandler comprising:
an operating arm having gripping equipment at an end thereof, the gripping equipment being configured to receive an object thereon;
a cab equipped with a roof, a windscreen, a rear spaced from and disposed opposite the windscreen, and a pair of side uprights, said roof and said windscreen being integrated in a single and continuous transparent or semi-transparent protective cover which comprises one or more materials designed to withstand the falling of hazardous material for the safety of an operator onboard the cab, said single and continuous transparent or semi-transparent protective cover including:
two glass layers which define an outermost surface and an innermost surface of the single and continuous transparent or semi-transparent protective cover, respectively;
three inner layers made of polyurethane; and
two inner layers made of polycarbonate,
wherein the three inner layers made of polyurethane and the two inner layers made of polycarbonate are disposed between the two glass layers and alternate with each other,
wherein the operating arm is movable with respect to the cab so as to position the object above the cab, and wherein the roof is configured to protect an operator if said object falls on the cab,
wherein said single and continuous transparent or semi-transparent protective cover extends laterally from a first side upright of the pair of side uprights to a second side upright of the pair of side uprights to provide an unobstructed and continuous view in front of the cab and above the cab,
wherein said single and continuous transparent or semi-transparent protective cover has an edge at the roof that extends between the first side upright and the second side upright of the pair of side uprights, and the edge at the roof is a rearmost edge of the single and continuous transparent or semi-transparent protective cover, and said edge of said single and continuous transparent or semi-transparent protective cover is spaced from said rear of said cab such that said single and continuous transparent or semi-transparent protective cover can deform or breakdown upon impact of said object but does not allow said object to pass through said single and continuous transparent or semi-transparent protective cover, and
wherein the outermost surface and the innermost surface of the single and continuous transparent or semi-transparent protective cover are each directly exposed to an ambient environment.
2. The telehandler according to claim 1, wherein each of the two glass layers has a thickness of between two and four millimetres.
3. The telehandler according to claim 1, wherein each of the two inner layers made of polycarbonate has a thickness of between twelve and eighteen millimetres.
4. The telehandler according to claim 1, wherein each of the three inner layers made of polyurethane has a thickness of between 0.5 millimetres and one millimetre.
5. The telehandler according to claim 1, wherein the single and continuous transparent or semi-transparent protective cover consists of the following succession of layers: a 3 mm glass layer, a 0.76 mm polyurethane layer, a 15 mm polycarbonate layer, a 0.76 mm polyurethane layer, a 15 mm polycarbonate layer, a 0.76 mm polyurethane layer and a 3 mm glass layer.
6. The telehandler according to claim 1, wherein said single and continuous transparent or semi-transparent protective cover is designed to withstand an impact of said object which has a kinetic energy of greater than 11000 Joules.
7. The telehandler according to claim 6, wherein said kinetic energy is substantially equal to 11600 Joules.
8. The telehandler according to claim 1, wherein the single and continuous transparent or semi-transparent protective cover is designed to withstand an impact of said object weighing at least 230 kg falling from a height of at least 4 metres.
9. The telehandler according to claim 8, wherein said object weighs substantially 238 kg and the height of falling is substantially 5 metres.
10. A telehandler comprising:
an operating arm having gripping equipment at an end thereof, the gripping equipment being configured to receive an object thereon;
a cab equipped with a roof, a windscreen, a rear spaced from and disposed opposite the windscreen, and a pair of side uprights, said roof and said windscreen being integrated in a single and continuous transparent or semi-transparent protective cover which comprises one or more materials designed to withstand the falling of hazardous material for the safety of an operator onboard the cab, said single and continuous transparent or semi-transparent protective cover including:
two glass layers which define an outermost surface and an innermost surface of the single and continuous transparent or semi-transparent protective cover, respectively, wherein each of the two glass layers has a thickness of between two and four millimetres;
three inner layers made of polyurethane; and
two inner layers made of polycarbonate,
wherein the three inner layers made of polyurethane and the two inner layers made of polycarbonate are disposed between the two glass layers and alternate with each other,
wherein the operating arm is movable with respect to the cab so as to position the object above the cab, and the roof is configured to protect an operator if said object falls on the cab, wherein the single and continuous transparent or semi-transparent protective cover is designed to withstand an impact of said object weighing at least 230 kg falling from a height of at least 4 metres,
wherein said single and continuous transparent or semi-transparent protective cover extends laterally from a first side upright of the pair of side uprights to a second side upright of the pair of side uprights to provide an unobstructed and continuous view in front of the cab and above the cab,
wherein said single and continuous transparent or semi-transparent protective cover has an edge at the roof that extends between the first side upright and the second side upright of the pair of side uprights, and the edge at the roof is a rearmost edge of the single and continuous transparent or semi-transparent protective cover, and said edge of said single and continuous transparent or semi-transparent protective cover is spaced from said rear of said cab such that said single and continuous transparent or semi-transparent protective cover can deform or breakdown upon impact of said object but does not allow said object to pass through said single and continuous transparent or semi-transparent protective cover, and wherein the outermost surface and the innermost surface of the single and continuous transparent or semi-transparent protective cover are each directly exposed to an ambient environment.

\* \* \* \* \*